United States Patent
Ran et al.

(10) Patent No.: US 12,528,907 B2
(45) Date of Patent: Jan. 20, 2026

(54) POLYHYDROXY AROMATIC INTERMEDIATE, PREPARATION THEREOF AND USE THEREOF IN POLYCONDENSATE WATER-REDUCER WITH BRANCHED SIDE CHAINS

(71) Applicants: SOBUTE NEW MATERIALS CO., LTD., Nanjing (CN); BOTE NEW MATERIALS TAIZHOU CO., LTD., Taizhou (CN)

(72) Inventors: Qianping Ran, Nanjing (CN); Zhen Huang, Nanjing (CN); Yong Yang, Nanjing (CN); Dongliang Zhou, Nanjing (CN); Tao Wang, Nanjing (CN); Xin Shu, Nanjing (CN); Jiaping Liu, Nanjing (CN); Jinxiang Hong, Nanjing (CN)

(73) Assignees: SOBUTE NEW MATERIALS CO., LTD., Jiangsu (CN); BOTE NEW MATERIALS TAIZHOU CO., LTD., Jiangsu (CN)

( * ) Notice: Subject to any disclaimer, the term of this patent is extended or adjusted under 35 U.S.C. 154(b) by 558 days.

(21) Appl. No.: 17/962,544

(22) Filed: Oct. 9, 2022

(65) Prior Publication Data
US 2023/0151140 A1 May 18, 2023

Related U.S. Application Data

(63) Continuation of application No. PCT/CN2021/130300, filed on Nov. 12, 2021.

(51) Int. Cl.
*C08G 61/10* (2006.01)
*C04B 24/28* (2006.01)
*C04B 103/30* (2006.01)
*C07C 41/09* (2006.01)
*C07C 43/23* (2006.01)

(52) U.S. Cl.
CPC ............. *C08G 61/10* (2013.01); *C04B 24/28* (2013.01); *C07C 41/09* (2013.01); *C07C 43/23* (2013.01); *C04B 2103/302* (2013.01); *C08G 2261/12* (2013.01); *C08G 2261/1422* (2013.01); *C08G 2261/1424* (2013.01); *C08G 2261/147* (2013.01); *C08G 2261/312* (2013.01)

(58) Field of Classification Search
CPC ............... C08G 61/10; C08G 2261/12; C08G 2261/1422; C08G 2261/1424; C08G 2261/14; C08G 2261/312; C04B 24/28; C04B 2103/302; C07C 41/09; C07C 43/23
See application file for complete search history.

(56) References Cited

U.S. PATENT DOCUMENTS

2019/0010090 A1* 1/2019 Kraus ................... C04B 24/246

* cited by examiner

*Primary Examiner* — Shane Fang
(74) *Attorney, Agent, or Firm* — Valet Patent Service Limited

(57) ABSTRACT

Provided are a polyhydroxy aromatic intermediate, preparation thereof and use thereof in a polycondensate water-reducer with branched side chains. The polycondensate water-reducer with branched side chains has a branched side chain structure which provides a stronger steric hindrance. The synergistic effect of the branched side chains and the rigid skeleton of the aromatic ring greatly improves the water-reducing ability. Especially under a condition of low water/cement ratio, the improvement in water-reducing ability is more obvious. The branched polyether side chain is more conducive to the formation of a thicker water film layer, which has an obvious viscosity reduction effect. The conformation of the branched polyether side chain is less affected by different ionic environments in the pore solution in cement, and thus has a stronger adaptability to various raw materials. The water-reducer is suitable for the preparation of high-strength concrete, self-compacting concrete and concrete with low water-to-binder ratio and high volume of mineral admixtures, especially for the preparation of concrete containing machine-made sand.

9 Claims, No Drawings

POLYHYDROXY AROMATIC INTERMEDIATE, PREPARATION THEREOF AND USE THEREOF IN POLYCONDENSATE WATER-REDUCER WITH BRANCHED SIDE CHAINS

TECHNICAL FIELD

The present application belongs to the technical field of concrete admixtures, and specifically to a polyhydroxy aromatic intermediate, preparation thereof and use thereof in a polycondensate water-reducer with branched side chains.

BACKGROUND

Concrete is generally composed of cementitious material (cement), coarse aggregate (stone), fine aggregate (sand), water and various chemical admixtures. As the fifth component of concrete, chemical admixture plays a pivotal role in the workability of freshly-mixed concrete and mechanical properties after hardening. Among various chemical admixtures, concrete water-reducer, also known as cement dispersant or superplasticizer, is the most widely used, when added to concrete, it can significantly reduce the water consumption of concrete and improve concrete's initial fluidity, so it can improve the mechanical strength after concrete hardening while maintaining the good construction workability of the concrete.

The development of concrete water-reducer can be roughly divided into three stages: the first generation of ordinary water-reducer represented by calcium lignosulfonate, the second generation of superplasticizer represented by sulphonated naphthalene formaldehyde polycondensate, and the third-generation of superplasticizer represented by polycarboxylates.

The water-reducers of the first and second generation are limited by problems such as large addition amount, insufficient water reduction, poor adaptability of cement, and large slump loss. The polycarboxylate superplasticizer that appeared in the early 1980s is considered to be the third-generation water-reducer. It has high water-reducing rate, low addition amount, and strong slump retention ability, and is the latest generation of water-reducer most widely used at home and abroad.

With the deepening of the application of the polycarboxylate water-reducer, some problems have also been found. First, modern buildings are showing a trend of high-rise and light-weight. In order to improve the strength of concrete, it is necessary to increase the amount of cementitious materials and greatly reduce the water consumption, which can easily lead to the problem of high viscosity of freshly-mixed concrete and difficult construction. Second, the compatibility of the polycarboxylate water-reducer with concrete raw materials is not good. In particular, there are large differences in the composition of cement mineral phases in different regions, resulting in significant differences in the ionic environment of the pore solution, which affects the comb conformation of the polycarboxylate. With the wider application of machine-made sand, this phenomenon is more prominent.

Chinese application with appl. no. CN200480011979.7 introduces hydrophobic long-chain alkyl acrylate copolymer into a comb polymer structure, which can reduce the viscosity of concrete. However, the introduction of hydrophobic units will cause a significant decrease in dispersion performance, and the improvement of viscosity by this method is limited. Patent CN20091077550.2 formulates polyethylene glycol in polycarboxylate mother liquor as a viscosity reducing component, which can reduce concrete viscosity and improve workability. However, the additionally added polyethylene glycol would introduce new cost.

Chinese application with appl. no. CN201510919314.6 adjusts the conformation of polycarboxylate molecules in the pore solution by introducing rigid functional groups to the backbone of the polycarboxylate molecules, which can improve its adaptability to raw materials. However, this method has to use RAFT reagents or pre-synthesize RAFT macromolecules, and the production cost and process requirements are high. Meanwhile, the obtained block polycarboxylate still contains a large number of carboxylate groups, which will still be affected by environmental ions, and there is still room for improvement in adaptability.

European application with appl. no. EP1203046 introduces trialkoxysilane instead of the carboxylate group into carboxylate side chains. The trialkoxysilane is not affected by the charge of environmental ions, and can chemically react with the CSH gel during cement hydration, so it can not only provide the force on the cement particles, but also avoid the influence of environmental ions. However, the preparation of this water-reducer requires isocyanates, the cost is high, and the dispersion performance is not good, and there is room for further improvement. Chinese application with appl. no CN201580070080.0 adopts terminal amino polyether and epoxy-containing silane coupling agent to carry out ring-opening reaction to obtain cement dispersant containing 1-2 trialkoxysilane groups. However, since the number of anchoring groups is too small, there is still a big gap in dispersing ability relative to the conventional polycarboxylate water-reducers.

SUMMARY

The present application provides a polyhydroxy aromatic intermediate, preparation thereof and use thereof in a polycondensate water-reducer with branched side chains. The polycondensate water-reducer with branched side chains has excellent dispersion performance, obvious viscosity reduction effect, and good adaptability of raw materials, and is suitable for the preparation of high-strength concrete, self-compacting concrete and concrete with low water-to-binder ratio and high volume of mineral admixtures, especially for the preparation of concrete containing machine-made sand.

The polyhydroxy aromatic intermediate F of the present application has a structural formula (V):

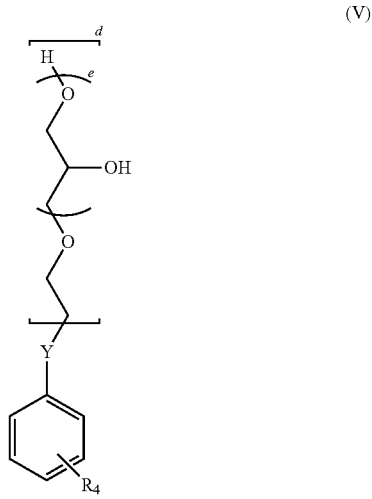

wherein $R_4$ is H, $C_1$-$C_4$ alkyl, or $C_1$-$C_4$ alkoxy; and wherein Y represents O or N, and when Y represents O, d=1 and e represents an integer from 1-5; and when Y represents N, d=2 and e represents an integer from 0-2.

The method for preparing the polyhydroxy aromatic intermediate of the present application comprises producing the polyhydroxy aromatic intermediate F by reacting a substance A with a substance D in the presence of a catalyst E; the general formula of the substance A is shown in formula (VI) below

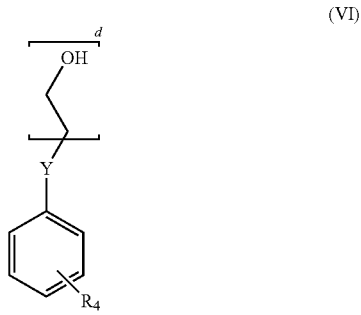

(VI)

wherein $R_4$ is H, $C_1$-$C_4$ alkyl, or $C_1$-$C_4$ alkoxy; and wherein Y represents O or N, and when Y represents O, d=1; and when Y represents N, d=2.

Further, the monomer A is selected from phenoxyethanol, 3-methylphenoxyethanol, 3-ethylphenoxyethanol, 4-methylphenoxyethanol, 3-methoxyphenoxyethanol, 3-ethoxyphenoxyethanol, 4-methoxyphenoxyethanol, and phenyldiethanolamine.

The catalyst E is a substance that is capable of abstracting active hydrogens, and is selected from sodium metal, sodium hydride, and sodium methoxide.

The amount of the catalyst E satisfies that the molar ratio of E/monomer A is 0.2-0.5, and if the amount of the catalyst is too low, the conversion rate will be unsatisfactory, and if the amount of the catalyst is too high, the viscosity of the entire synthesis system will be too large to operate.

The substance D is glycidol. The amount of D should satisfy the following conditions: when Y is O, the D/A molar ratio is 1-5, and when Y is N, the D/A molar ratio is 0-2, and the molar ratio of D/A determines the number of hydroxyl groups in the product polyhydroxy aromatic intermediate F.

The method for preparing the polyhydroxy aromatic intermediate comprises the following specific steps: slowly adding the catalyst E to the monomer A with stirring at room temperature, continuing stirring for 10-60 minutes at room temperature, then raising the temperature to 80-120° C., adding the substance D within 5-24 h and finally cooling to room temperature, to yield the polyhydroxy aromatic intermediate F.

Use of the polyhydroxy aromatic intermediate F is for the synthesis of an aromatic intermediate with multiple polyether side chains, which is further synthesized into a polycondensate water-reducer with branched side chains.

The molecular structure of the polycondensate water-reducer with branched side chains of the present application comprises three structural units, aromatic structural unit I with multiple polyether side chains, phosphate-based aromatic structural unit II, and methylene structural unit III; the aromatic structural unit I with multiple polyether side chains is an aromatic moiety with 2-4 polyether side chains; the aromatic moiety includes phenyl, methylphenyl or methoxyphenyl;

the phosphate-based aromatic structural unit II is an aromatic moiety with 1-2 phosphonate monoester; the aromatic moiety includes phenyl, methylphenyl or methoxyphenyl, and the rest are side chains; and the methylene structural unit III connects the aromatic structural unit with multiple polyether side chains and the phosphate-based aromatic structural unit, the connected structural units are the same or different, and the methylene structural unit connects any two of the structures of the aromatic structural unit I with multiple polyether side chains and the phosphate-based aromatic structural unit II.

The aromatic structural unit I with multiple polyether side chains is obtained from an addition reaction of the polyhydroxy aromatic intermediate F and ethylene oxide;

the aromatic structural unit I with multiple polyether side chains is any one of general formula (Ia) or (Ib);

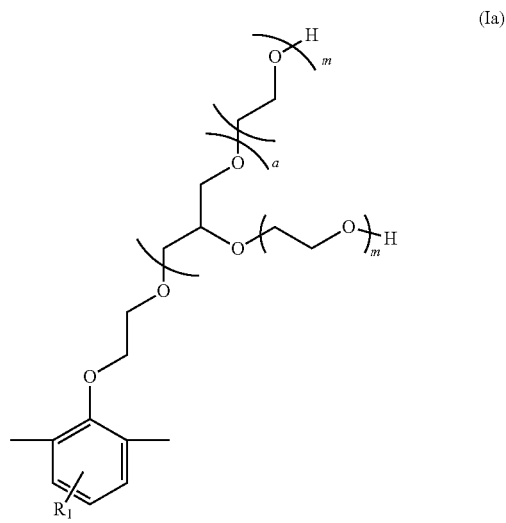

(Ia)

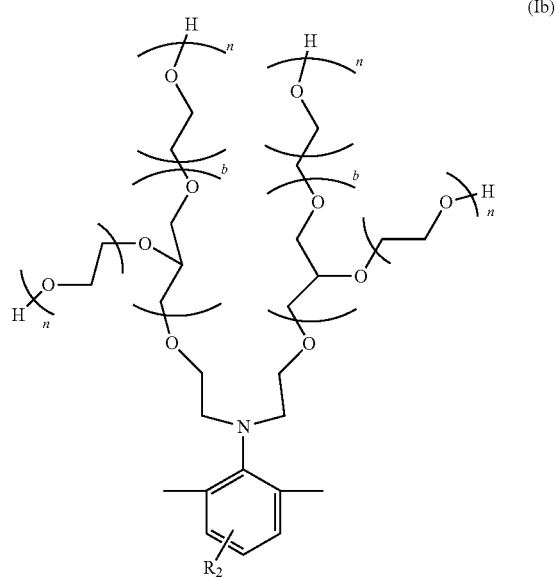

(Ib)

wherein $R_1$ and $R_2$ are each independently the same or different H, $C_1$-$C_4$ alkyl, or $C_1$-$C_4$ alkoxy.

Wherein a represents an integer from 1-5, and m represents an integer from 10-50.

Wherein b represents an integer from 0-2, and n represents an integer from 10-50.

a and b determine the number of side chains, or the degree of branching, on a single aromatic compound to be a+1 and 2b+2, respectively. If the number of side chains is too large, the steric hindrance effect of the monomer (Ia) and the monomer (Ib) will increase. Excessive steric hindrance will affect their polycondensation activity toward monomer (II), but if the number of side chains is too small, the branched structure cannot be formed and the steric hindrance effect is too low to form a sufficient water film thickness, which will affect both dispersion performance and viscosity reduction performance.

m and n each independently represents integers of 10-50. m and n are the number of polyoxyethylene repeating units in a single side chain, which determines the length of a single side chain. If the length is too short, the steric hindrance effect is too low, and if the length is too long, the polycondensation activity will be compromised.

The phosphate-based aromatic structural unit (II) conforms to a general formula (II):

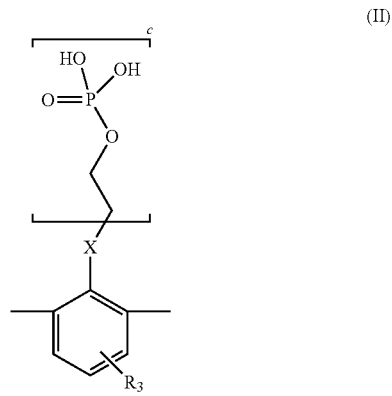

(II)

wherein $R_3$ is H, $C_1$-$C_4$ alkyl, or $C_1$-$C_4$ alkoxy; and wherein X represents O or N, and when X represents O, c=1; and when X represents N, c=2.

The methylene structural unit III connects two aromatic structural units, and the two aromatic structural units are each independently the same or different and represent the structural unit (Ia) or structural unit (Ib) and the structural unit (II) of the polycondensate.

The molar ratio of the structural unit (Ia), the structural unit (Ib), and the structural unit (II) of the polycondensate water-reducer of the present application should satisfy (II)/(Ia)=0.5-8, and (II)/(Ib)=0.5-8.

The polycondensate water-reducer with branched side chains of the present application has a weight-average molecular weight of 10,000 to 80,000.

The method for preparing the polycondensate water-reducer with branched side chains of the present application comprises preparing the water-reducer by a polycondensation reaction of an aromatic monomer with multiple polyether side chains, a phosphate-based aromatic monomer, and a condensation reagent under acid catalysis.

The aromatic monomer with multiple polyether side chains is a source monomer of the aromatic structural unit (Ia) or (Ib) with multiple polyether side chains, and is an aromatic ring which comprises multiple branched polyether side chains and is unsubstituted or substituted by methyl or methoxy.

The phosphate-based aromatic monomer is a source monomer of the phosphate-based aromatic structural unit II, and is an aromatic ring which comprises a phosphonate monoester adsorption group and is unsubstituted or substituted by methyl or methoxy.

The phosphate-based aromatic structural unit II mainly provides adsorption groups that produce electrostatic adsorption with positively charged cement particles. The aromatic structural unit with multiple polyether side chains comprises multiple branched side chains and the polyoxyethylene segment on the side chain can form a hydrogen bond with water to form a hydration film, thereby providing steric hindrance and dispersing effect, preventing the aggregation of cement particles, and providing dispersibility. Meanwhile, the water film layer can also have a lubricating effect, reduce the friction between the cement particles, and reduce the viscosity of entire dispersion system.

The molar ratio of the phosphate-based aromatic structural unit II and the aromatic structural unit (Ia) or (Ib) with multiple polyether side chains should satisfy (II)/(Ia)=0.5-8, and (II)/(Ib)=0.5-8. If the molar ratio of the phosphate-based aromatic structural unit (II) is too small, the adsorption groups will be too few, the charge density will be too low, and it is difficult to generate enough adsorption to provide dispersion efficiency; and if the molar ratio of the phosphate-based aromatic structural unit (II) is too high, on the one hand, due to the strong self-polymerization tendency of the phosphate-based aromatic structural unit (II), the conversion rate of the aromatic structural unit (Ia) or (Ib) with multiple polyether side chains will be too low, on the other hand, the too high adsorption ratio is unfavorable for maintenance of dispersion.

The aromatic monomer with multiple polyether side chains is obtained from an addition reaction of a polyhydroxy aromatic intermediate and ethylene oxide, and is specifically from reacting the polyhydroxy aromatic intermediate F with ethylene oxide in the presence of a catalyst E to generate the aromatic monomer with multiple polyether side chains.

The number of hydroxyl groups in the polyhydroxy aromatic intermediate F determines the number of side chains, or the degree of branching, on the monomer (Ia) and the monomer (Ib), i.e., the a and b values in the above general formulas (Ia) and (Ib).

The catalyst E is a substance that is capable of abstracting active hydrogens, and is selected from sodium metal, sodium hydride, and sodium methoxide.

The amount of the catalyst E satisfies that the molar ratio of E/F is 0.02-0.1, if the amount of the catalyst is too low, it is difficult to effectively initiate the reaction, but if the amount of the catalyst is too high, the reaction speed is too fast and the exotherm is too violent, resulting in the pressure of ethylene oxide being too high, which affects production safety.

The amount of ethylene oxide (EO) should satisfy the following conditions: when Y is O, EO/F molar ratio is 10(a+1)–50(a+1), and when Y is N, EO/F molar ratio is 10(2b+2)–50(2b+2), and the molar ratio of EO/F determines the number of polyoxyethylene repeating units on a single side chain of the monomer (Ia) and the monomer (Ib), i.e., the m and n values in the above general formulas (Ia) and (Ib).

The method for preparing the aromatic monomer with multiple polyether side chains comprises the following specific steps: slowly adding the catalyst E to the polyhydroxy aromatic intermediate F with stirring at room temperature, continue stirring for 10-60 minutes at room temperature, then raising the temperature to 100-150° C., and after reaching a predetermined temperature, slowly feeding ethylene oxide EO into the system for reaction, to yield the aromatic monomer with multiple polyether side chains.

The phosphate-based aromatic monomer can be described in more detail by a general formula (III)

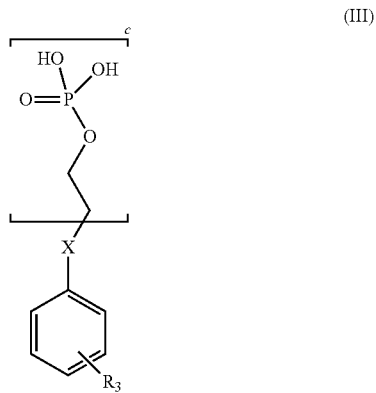

(III)

wherein $R_3$ is H, $C_1$-$C_4$ alkyl, or $C_1$-$C_4$ alkoxy; and
wherein X represents O or N, and when X represents O, c=1; and when X represents N, c=2.

The phosphate-based aromatic monomer is obtained by an esterification reaction of a monomer J with a phosphonating reagent B;
the general formula of the monomer J is shown in (IV), the monomer J and the aforementioned monomer A conform to the same general formula, and the monomer J is the same as or different from the monomer A.

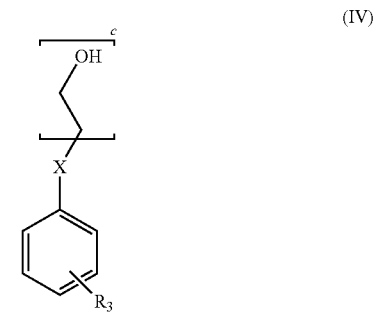

(IV)

wherein $R_3$ is $C_1$-$C_4$ alkyl, or $C_1$-$C_4$ alkoxy; and
wherein X represents O or N, and when X represents O, c=1; and when X represents N, c=2.

The phosphonating reagent B is selected from orthophosphoric acid, phosphorus pentoxide or polyphosphoric acid. The number of phosphorus atoms in the phosphonating reagent and the number of hydroxyl groups in the monomer A should satisfy the molar ratio of 1.2 to 3, if the ratio is too low, the efficiency of the esterification reaction will be compromised, and if the ratio is too high, phosphonate diester will be easily formed.

The esterification reaction of a monomer J with a phosphonating reagent B is carried out as follows: slowly adding the phosphonating reagent B to the monomer A with stirring at room temperature, continuing stirring for 30 minutes at room temperature, then raising the temperature to 80-120° C., and after reaching a predetermined temperature, maintaining the temperature for reaction for 2-10 h and finally cooling to room temperature, to yield the phosphate-based aromatic monomer.

The polycondensate water-reducer with branched side chains of the present application is obtained by a polycondensation reaction of the phosphate-based aromatic monomer, the aromatic monomer with multiple polyether side chains and the condensation reagent H under acid catalysis.

The condensation reagent H includes formaldehyde, paraformaldehyde, glyoxylic acid and benzaldehyde, and the molar ratio of the condensation reagent to the total amount of the phosphate-based aromatic monomer plus the aromatic monomer with multiple polyether side chains should satisfy 1.0-1.5, if the ratio is too low, the conversion rate of the polycondensation reaction and the molecular weight of the product will be affected, but if the ratio is too high, the crosslinking degree will be too high, resulting in an excessively high molecular weight or even gelation.

The acid I for catalysis and dehydration in the polycondensation reaction includes inorganic acid or organic acid, including sulfuric acid, methanesulfonic acid, ethanesulfonic acid, 2-hydroxybenzenesulfonic acid, 3-hydroxybenzenesulfonic acid, and 4-hydroxybenzenesulfonic acid. The molar ratio of the acid I to the total amount of the phosphate-based aromatic monomer plus the aromatic monomer with multiple polyether side chains should satisfy 0.25-0.65, If the ratio is too low, the polycondensation reaction rate will be compromised, and if the ratio is too high, the reaction will be extremely violent, which will easily lead to gelation.

The method for preparing the polycondensate water-reducer with branched side chains comprises the following specific steps: mixing the phosphate-based aromatic monomer, the aromatic monomer with multiple polyether side chains, the condensation reagent H and a catalytic acid I and stirring them evenly, raising the temperature to 100-150° C., maintaining the temperature for reaction for 2-10 h and finally cooling to room temperature, and preparing the product into an aqueous solution with pH=7 and a solid content of 30% using sodium hydroxide and water, to yield the polycondensate water-reducer with branched side chains of the present application.

Compared with the prior art, the present application has the following advantages: the polycondensate water-reducer with branched side chains of the present application has a branched side chain structure which provides a stronger steric hindrance; the synergistic effect of the branched side chains and the rigid skeleton of the aromatic ring greatly improves the water-reducing ability, especially under a condition of low water/cement ratio, it brings a more obvious improvement in water-reducing ability; and the branched polyether side chain is more conducive to the formation of a thicker water film layer, which has a certain viscosity reduction effect, reduces the tendency to intercalate adsorption with clay, and has a stronger adaptability to raw materials.

DETAILED DESCRIPTION

The following examples describe in more detail the preparation of polymeric products according to the method of the present application, and are given by way of illustration for the purpose of enabling those skilled in the art to understand and implement the present application. These examples in no way limit the scope of the present application. All equivalent changes or modifications made according to the spirit of the present application should be included within the protection scope of the present application.

The codes of raw materials used in the synthetic examples and comparative synthetic examples are shown in Table 1:

TABLE 1

The codes of raw materials in the synthetic examples and comparative synthetic examples

| Codes | Monomer name | Source |
|---|---|---|
| A1 | Phenoxyethanol | Commercially available |
| A2 | 3-methylphenoxyethanol | Commercially available |
| A3 | 3-ethylphenoxyethanol | Commercially available |
| A4 | 4-methylphenoxyethanol | Commercially available |
| A5 | 3-methoxyphenoxyethanol | Commercially available |
| A6 | 3-ethoxyphenoxyethanol | Commercially available |
| A7 | 4-methoxyphenoxyethanol | Commercially available |
| A8 | Phenyldiethanolamine | Commercially available |
| B1 | Phosphoric acid | Commercially available |
| B2 | Phosphorus pentoxide | Commercially available |
| B3 | Polyphosphoric acid | Commercially available |
| D | Glycidol | Commercially available |
| E1 | Sodium metal | Commercially available |
| E2 | Sodium hydride | Commercially available |
| E3 | Sodium methoxide | Commercially available |

Synthesis Examples 1-9 and Comparative Synthesis Examples 1-6 are directed to the synthesis method of the monomer (II) used in the present application.

In the synthesis examples of the present application, the conversion rate of the reaction and the phosphonate monoester content were measured by Shimadzu 2030 high performance liquid chromatography system, and the experimental conditions were as follows:

Chromatographic column: $C_{18}$ column
Mobile phase: methanol/water (volume ratio 4:1) solution
Mobile-phase velocity: 0.8 ml/min
Detector: differential refractive index detector
Column temperature: 30° C.

Synthesis Example 1 (Synthesis of Monomer (II) $C_1$)

To a glass reactor equipped with a thermometer, a stirrer and a reflux condenser, 100 g of A1 was added. Then 125.17 g of B1 was added to the reactor while stirring at room temperature. After further stirring at room temperature for 30 minutes, the temperature was raised to 90° C., under which the reaction was continued for 7 hours. After cooling to room temperature, a brown-red solid $C_1$ was obtained. The conversion rate was 97.2% and the monoester content was 96.1%, as measured by liquid chromatography.

Synthesis Example 2 (Synthesis of Monomer (II) C2)

To a glass reactor equipped with a thermometer, a stirrer and a reflux condenser, 100 g of A2 was added. Then 60.63 g of B2 was added to the reactor while stirring at room temperature. After further stirring at room temperature for 30 minutes, the temperature was raised to 85° C., under which the reaction was continued for 10 hours. After cooling to room temperature, a brown-red solid $C_2$ was obtained. The conversion rate was 93.4% and the monoester content was 95.9%, as measured by liquid chromatography.

Synthesis Example 3 (Synthesis of Monomer (II) C3)

To a glass reactor equipped with a thermometer, a stirrer and a reflux condenser, 100 g of A3 was added. Then 125.62 g of B3 was added to the reactor while stirring at room temperature. After further stirring at room temperature for 30 minutes, the temperature was raised to 100° C., under which the reaction was continued for 5 hours. After cooling to room temperature, a brown-red solid C3 was obtained. The conversion rate was 94.8% and the monoester content was 95.1%, as measured by liquid chromatography.

Synthesis Example 4 (Synthesis of Monomer (II) C4)

To a glass reactor equipped with a thermometer, a stirrer and a reflux condenser, 100 g of A4 was added. Then 164.62 g of B3 was added to the reactor while stirring at room temperature. After further stirring at room temperature for 30 minutes, the temperature was raised to 105° C., under which the reaction was continued for 3 hours. After cooling to room temperature, a brown-red solid C4 was obtained. The conversion rate was 97.3% and the monoester content was 95.7%, as measured by liquid chromatography.

Synthesis Example 5 (Synthesis of Monomer (II) C5)

To a glass reactor equipped with a thermometer, a stirrer and a reflux condenser, 100 g of A5 was added. Then 99.30 g of B3 was added to the reactor while stirring at room temperature. After further stirring at room temperature for 30 minutes, the temperature was raised to 115° C., under which the reaction was continued for 2 hours. After cooling to room temperature, a brown-red solid C5 was obtained. The conversion rate was 93.9% and the monoester content was 95.9%, as measured by liquid chromatography.

Synthesis Example 6 (Synthesis of Monomer (II) C6)

To a glass reactor equipped with a thermometer, a stirrer and a reflux condenser, 100 g of A6 was added. Then 91.67 g of B3 was added to the reactor while stirring at room temperature. After further stirring at room temperature for 30 minutes, the temperature was raised to 110° C., under which the reaction was continued for 3 hours. After cooling to room temperature, a brown-red solid C6 was obtained. The conversion rate was 97.5% and the monoester content was 96.3%, as measured by liquid chromatography.

Synthesis Example 7 (Synthesis of Monomer (II) C7)

To a glass reactor equipped with a thermometer, a stirrer and a reflux condenser, 100 g of A7 was added. Then 74.48 g of B3 was added to the reactor while stirring at room temperature. After further stirring at room temperature for 30 minutes, the temperature was raised to 100° C., under which the reaction was continued for 5 hours. After cooling to room temperature, a brown-red solid C7 was obtained. The conversion rate was 94.0% and the monoester content was 96.6%, as measured by liquid chromatography.

Synthesis Example 8 (Synthesis of Monomer (II) C8)

To a glass reactor equipped with a thermometer, a stirrer and a reflux condenser, 100 g of A8 was added. Then 182.59 g of B3 was added to the reactor while stirring at room temperature. After further stirring at room temperature for 30 minutes, the temperature was raised to 100° C., under which the reaction was continued for 5 hours. After cooling to room temperature, a brown-red solid C7 was obtained. The conversion rate was 95.7% and the monoester content was 96.5%, as measured by liquid chromatography.

Synthesis Example 9 (Synthesis of Monomer (II) C9)

To a glass reactor equipped with a thermometer, a stirrer and a reflux condenser, 100 g of A1 was added. Then 90.65 g of B3 was added to the reactor while stirring at room temperature. After further stirring at room temperature for 30 minutes, the temperature was raised to 100° C., under which the reaction was continued for 5 hours. After cooling to room temperature, a brown-red solid C9 was obtained. The conversion rate was 94.2% and the monoester content was 95.3%, as measured by liquid chromatography.

Comparative Synthesis Example 1

To a glass reactor equipped with a thermometer, a stirrer and a reflux condenser, 100 g of A1 was added. Then 60.43 g of B3 was added to the reactor while stirring at room temperature. After further stirring at room temperature for 30 minutes, the temperature was raised to 100° C., under which the reaction was continued for 5 hours. After cooling to room temperature, a brown-red solid C10 was obtained. The conversion rate was 58.8% and the monoester content was 94.9%, as measured by liquid chromatography.

The amount of the phosphonating reagent used in the Comparative Synthesis Example 1 is relatively small as compared to that in the Synthesis Example 9, resulting in a very low conversion rate of the esterification reaction.

Comparative Synthesis Example 2

To a glass reactor equipped with a thermometer, a stirrer and a reflux condenser, 100 g of A1 was added. Then 302.16 g of B3 was added to the reactor while stirring at room temperature. After further stirring at room temperature for 30 minutes, the temperature was raised to 100° C., under which the reaction was continued for 5 hours. After cooling to room temperature, a brown-red solid C11 was obtained. The conversion rate was 97.8% and the monoester content was 75.8%, as measured by liquid chromatography.

The amount of the phosphonating reagent used in the Comparative Synthesis Example 2 is relatively large as compared to that in the Synthesis Example 9, resulting in a lower content of phosphonate monoester.

Comparative Synthesis Example 3

To a glass reactor equipped with a thermometer, a stirrer and a reflux condenser, 100 g of A1 was added. Then 90.65 g of B3 was added to the reactor while stirring at room temperature. After further stirring at room temperature for 30 minutes, the temperature was raised to 70° C., under which the reaction was continued for 5 hours. After cooling to room temperature, a brown-red solid C12 was obtained. The conversion rate was 69.2% and the monoester content was 91.5%, as measured by liquid chromatography.

The temperature of the phosphonylation reaction in the Comparative Synthesis Example 3 is relatively low as compared to that in the Synthesis Example 9, resulting in a lower conversion rate of the esterification reaction.

Comparative Synthesis Example 4

To a glass reactor equipped with a thermometer, a stirrer and a reflux condenser, 100 g of A1 was added. Then 90.65 g of B3 was added to the reactor while stirring at room temperature. After further stirring at room temperature for 30 minutes, the temperature was raised to 140° C., under which the reaction was continued for 5 hours. After cooling to room temperature, a brown-red solid C13 was obtained. The conversion rate was 95.0% and the monoester content was 56.0%, as measured by liquid chromatography.

The temperature of the phosphonylation reaction in the Comparative Synthesis Example 4 is relatively high as compared to that in the Synthesis Example 9, resulting in a very low content of phosphonate monoester.

Comparative Synthesis Example 5

To a glass reactor equipped with a thermometer, a stirrer and a reflux condenser, 100 g of A1 was added. Then 90.65 g of B3 was added to the reactor while stirring at room temperature. After further stirring at room temperature for 30 minutes, the temperature was raised to 100° C., under which the reaction was continued for 1 hour. After cooling to room temperature, a brown-red solid C14 was obtained. The conversion rate was 68.9% and the monoester content was 96.3%, as measured by liquid chromatography.

The duration of the phosphonylation reaction in the Comparative Synthesis Example 5 is too short as compared to that in the Synthesis Example 9, resulting in a lower conversion rate of the esterification reaction.

Comparative Synthesis Example 6

To a glass reactor equipped with a thermometer, a stirrer and a reflux condenser, 100 g of A1 was added. Then 90.65 g of B3 was added to the reactor while stirring at room temperature. After further stirring at room temperature for 30 minutes, the temperature was raised to 100° C., under which the reaction was continued for 20 hours. After cooling to room temperature, a brown-red solid C14 was obtained. The conversion rate was 96.9% and the monoester content was 67.3%, as measured by liquid chromatography.

The duration of the phosphonylation reaction in the Comparative Synthesis Example 6 is relatively long as compared to that in the Synthesis Example 9, resulting in a lower content of phosphonate monoester.

Synthesis Examples 10-27 and Comparative Synthesis Examples 7-14 are directed to the synthesis method of the monomer (I) used in the present application.

Among them, Synthesis Examples 10-18 and Comparative Synthesis Examples 7-9 are directed to a first-step reaction, i.e., the preparation of polyhydroxy aromatic intermediate F Synthesis Example 10 (Synthesis of Polyhydroxy Aromatic Intermediate F1)

To a glass reactor equipped with a thermometer, a stirrer, a dropping funnel and a reflux condenser, 100 g of A1 was added. Then 4.16 g of E1 was added to the reactor while stirring at room temperature. After further stirring at room temperature for 30 minutes, the temperature was raised to 85° C., under which 107.24 g of D was added to the reaction system within 24 hours. After cooling to room temperature, a light yellow liquid, i.e., the polyhydroxy aromatic intermediate F1, was obtained.

Synthesis Example 11 (Synthesis of Polyhydroxy Aromatic Intermediate F2)

To a glass reactor equipped with a thermometer, a stirrer, a dropping funnel and a reflux condenser, 100 g of A2 was added. Then 3.63 g of E2 was added to the reactor while stirring at room temperature. After further stirring at room temperature for 30 minutes, the temperature was raised to 105° C., under which 97.37 g of D was added to the reaction system within 10 hours. After cooling to room temperature, a light yellow liquid, i.e., the polyhydroxy aromatic intermediate F2, was obtained.

Synthesis Example 12 (Synthesis of Polyhydroxy Aromatic Intermediate F3)

To a glass reactor equipped with a thermometer, a stirrer, a dropping funnel and a reflux condenser, 100 g of A3 was added. Then 8.12 g of E3 was added to the reactor while stirring at room temperature. After further stirring at room temperature for 30 minutes, the temperature was raised to 110° C., under which 133.75 g of D was added to the reaction system within 8 hours. After cooling to room temperature, a light yellow liquid, i.e., the polyhydroxy aromatic intermediate F3, was obtained.

Synthesis Example 13 (Synthesis of Polyhydroxy Aromatic Intermediate F4)

To a glass reactor equipped with a thermometer, a stirrer, a dropping funnel and a reflux condenser, 100 g of A4 was added. Then 4.73 g of E2 was added to the reactor while stirring at room temperature. After further stirring at room temperature for 30 minutes, the temperature was raised to 90° C., under which 146.06 g of D was added to the reaction system within 20 hours. After cooling to room temperature, a light yellow liquid, i.e., the polyhydroxy aromatic intermediate F4, was obtained.

Synthesis Example 14 (Synthesis of Polyhydroxy Aromatic Intermediate F5)

To a glass reactor equipped with a thermometer, a stirrer, a dropping funnel and a reflux condenser, 100 g of A5 was added. Then 5.00 g of E2 was added to the reactor while stirring at room temperature. After further stirring at room temperature for 30 minutes, the temperature was raised to 100° C., under which 176.21 g of D was added to the reaction system within 10 hours. After cooling to room temperature, a light yellow liquid, i.e., the polyhydroxy aromatic intermediate F5, was obtained.

Synthesis Example 15 (Synthesis of Polyhydroxy Aromatic Intermediate F6)

To a glass reactor equipped with a thermometer, a stirrer, a dropping funnel and a reflux condenser, 100 g of A6 was added. Then 4.22 g of E2 was added to the reactor while stirring at room temperature. After further stirring at room temperature for 30 minutes, the temperature was raised to 105° C., under which 203.34 g of D was added to the reaction system within 10 hours. After cooling to room temperature, a light yellow liquid, i.e., the polyhydroxy aromatic intermediate F6, was obtained.

Synthesis Example 16 (Synthesis of Polyhydroxy Aromatic Intermediate F7)

To a glass reactor equipped with a thermometer, a stirrer, a dropping funnel and a reflux condenser, 100 g of A7 was added. Then 3.14 g of E2 was added to the reactor while stirring at room temperature. After further stirring at room temperature for 30 minutes, the temperature was raised to 105° C., under which 44.05 g of D was added to the reaction system within 10 hours. After cooling to room temperature, a light yellow liquid, i.e., the polyhydroxy aromatic intermediate F7, was obtained.

Synthesis Example 17 (Synthesis of Polyhydroxy Aromatic Intermediate F8)

To a glass reactor equipped with a thermometer, a stirrer, a dropping funnel and a reflux condenser, 100 g of A8 was added. Then 7.87 g of E2 was added to the reactor while stirring at room temperature. After further stirring at room temperature for 30 minutes, the temperature was raised to 105° C., under which 108.00 g of D was added to the reaction system within 10 hours. After cooling to room temperature, a light yellow liquid, i.e., the polyhydroxy aromatic intermediate F8, was obtained.

Synthesis Example 18 (Synthesis of Polyhydroxy Aromatic Intermediate F9)

To a glass reactor equipped with a thermometer, a stirrer, a dropping funnel and a reflux condenser, 100 g of A1 was added. Then 4.34 g of E2 was added to the reactor while stirring at room temperature. After further stirring at room temperature for 30 minutes, the temperature was raised to 105° C., under which 107.24 g of D was added to the reaction system within 10 hours. After cooling to room temperature, a light yellow liquid, i.e., the polyhydroxy aromatic intermediate F9, was obtained.

Comparative Synthesis Example 7 (Synthesis of Polyhydroxy Aromatic Intermediate F10)

To a glass reactor equipped with a thermometer, a stirrer, a dropping funnel and a reflux condenser, 100 g of A1 was added. Then 4.34 g of E2 was added to the reactor while stirring at room temperature. After further stirring at room temperature for 30 minutes, the temperature was raised to 105° C., under which 375.33 g of D was added to the reaction system within 10 hours. After cooling to room temperature, a light yellow liquid, i.e., the polyhydroxy aromatic intermediate F10, was obtained.

The D used in the Comparative Synthesis Example 7 is relatively high as compared to that in the Synthesis Example 18, resulting in a higher number of hydroxyl groups in the obtained polyhydroxy aromatic intermediate, and a higher number of side chains on the subsequent individual structural unit.

Comparative Synthesis Example 8

To a glass reactor equipped with a thermometer, a stirrer, a dropping funnel and a reflux condenser, 100 g of A1 was added. Then 1.74 g of E2 was added to the reactor while stirring at room temperature. After further stirring at room temperature for 30 minutes, the temperature was raised to 105° C., under which 107.24 g of D was added to the reaction system within 10 hours. After cooling to room temperature, a colorless liquid was obtained.

The catalyst E used in the Comparative Synthesis Example 8 is relatively low as compared to that in the Synthesis Example 18, resulting in that the reaction of substances A and D is difficult to proceed.

Comparative Synthesis Example 9

To a glass reactor equipped with a thermometer, a stirrer, a dropping funnel and a reflux condenser, 100 g of A1 was added. Then 13.90 g of E2 was added to the reactor while stirring at room temperature. After further stirring at room temperature for 30 minutes, the viscosity of the system gradually increased, eventually forming a brown solid that was difficult to stir.

The catalyst E used in the Comparative Synthesis Example 9 is too high as compared to that in the Synthesis Example 18, resulting in that the viscosity of the whole synthesis system is too large to operate.

Synthesis Examples 19-27 and Comparative Synthesis Examples 10-13 are directed to a second-step reaction, i.e., the preparation of aromatic compounds G with multiple polyether side chains.

Synthesis Example 19 (Synthesis of Aromatic Compound G1 with Multiple Polyether Side Chains)

To a stainless steel reactor equipped with a thermometer, a stirrer and a feed tube, 120 g of F1 was added. Then 0.19 g of E1 was added to the reactor while stirring at room temperature. After further stirring at room temperature for 30 minutes, the system was evacuated after 3 nitrogen replacements and the temperature was raised to 110° C., under which 1162 g of ethylene oxide (EO) was fed to the system at a pressure during feeding not higher than 0.4 Mpa. After cooling to room temperature, a white or pale yellow solid, i.e., the compound G1, was obtained.

Synthesis Example 20 (Synthesis of Aromatic Compound G2 with Multiple Polyether Side Chains)

To a stainless steel reactor equipped with a thermometer, a stirrer and a feed tube, 120 g of F2 was added. Then 0.48 g of E2 was added to the reactor while stirring at room temperature. After further stirring at room temperature for 30 minutes, the system was evacuated after 3 nitrogen replacements and the temperature was raised to 120° C., under which 1108 g of ethylene oxide (EO) was fed to the system at a pressure during feeding not higher than 0.4 Mpa. After cooling to room temperature, a white or pale yellow solid, i.e., the compound G2, was obtained.

Synthesis Example 21 (Synthesis of Aromatic Compound G3 with Multiple Polyether Side Chains)

To a stainless steel reactor equipped with a thermometer, a stirrer and a feed tube, 120 g of F3 was added. Then 1.33 g of E3 was added to the reactor while stirring at room temperature. After further stirring at room temperature for 30 minutes, the system was evacuated after 3 nitrogen replacements and the temperature was raised to 140° C., under which 816 g of ethylene oxide (EO) was fed to the system at a pressure during feeding not higher than 0.4 Mpa. After cooling to room temperature, a white or pale yellow solid, i.e., the compound G3, was obtained.

Synthesis Example 22 (Synthesis of Aromatic Compound G4 with Multiple Polyether Side Chains)

To a stainless steel reactor equipped with a thermometer, a stirrer and a feed tube, 120 g of F4 was added. Then 0.77 g of E2 was added to the reactor while stirring at room temperature. After further stirring at room temperature for 30 minutes, the system was evacuated after 3 nitrogen replacements and the temperature was raised to 145° C., under which 846 g of ethylene oxide (EO) was fed to the system at a pressure during feeding not higher than 0.4 Mpa. After cooling to room temperature, a white or pale yellow solid, i.e., the compound G4, was obtained.

Synthesis Example 23 (Synthesis of Aromatic Compound G5 with Multiple Polyether Side Chains)

To a stainless steel reactor equipped with a thermometer, a stirrer and a feed tube, 120 g of F5 was added. Then 0.31 g of E2 was added to the reactor while stirring at room temperature. After further stirring at room temperature for 30 minutes, the system was evacuated after 3 nitrogen replacements and the temperature was raised to 130° C., under which 909 g of ethylene oxide (EO) was fed to the system at a pressure during feeding not higher than 0.4 Mpa. After cooling to room temperature, a white or pale yellow solid, i.e., the compound G5, was obtained.

Synthesis Example 24 (Synthesis of Aromatic Compound G6 with Multiple Polyether Side Chains)

To a stainless steel reactor equipped with a thermometer, a stirrer and a feed tube, 120 g of F6 was added. Then 0.26 g of E2 was added to the reactor while stirring at room temperature. After further stirring at room temperature for 30 minutes, the system was evacuated after 3 nitrogen replacements and the temperature was raised to 130° C., under which 573 g of ethylene oxide (EO) was fed to the system at a pressure during feeding not higher than 0.4 Mpa. After cooling to room temperature, a white or pale yellow solid, i.e., the compound G6, was obtained.

Synthesis Example 25 (Synthesis of Aromatic Compound G7 with Multiple Polyether Side Chains)

To a stainless steel reactor equipped with a thermometer, a stirrer and a feed tube, 120 g of F7 was added. Then 0.59 g of E2 was added to the reactor while stirring at room temperature. After further stirring at room temperature for 30 minutes, the system was evacuated after 3 nitrogen replacements and the temperature was raised to 130° C., under which 1962 g of ethylene oxide (EO) was fed to the system at a pressure during feeding not higher than 0.4 Mpa. After cooling to room temperature, a white or pale yellow solid, i.e., the compound G7, was obtained.

Synthesis Example 26 (Synthesis of Aromatic Compound G8 with Multiple Polyether Side Chains)

To a stainless steel reactor equipped with a thermometer, a stirrer and a feed tube, 120 g of F8 was added. Then 0.50 g of E2 was added to the reactor while stirring at room temperature. After further stirring at room temperature for 30 minutes, the system was evacuated after 3 nitrogen replacements and the temperature was raised to 140° C., under which 1110 g of ethylene oxide (EO) was fed to the system at a pressure during feeding not higher than 0.4 Mpa. After cooling to room temperature, a white or pale yellow solid, i.e., the compound G8, was obtained.

Synthesis Example 27 (Synthesis of Aromatic Compound G9 with Multiple Polyether Side Chains)

To a stainless steel reactor equipped with a thermometer, a stirrer and a feed tube, 120 g of F9 was added. Then 0.50 g of E2 was added to the reactor while stirring at room temperature. After further stirring at room temperature for 30 minutes, the system was evacuated after 3 nitrogen replacements and the temperature was raised to 120° C., under which 719 g of ethylene oxide (EO) was fed to the system at a pressure during feeding not higher than 0.4 Mpa. After cooling to room temperature, a pale yellow solid, i.e., the compound G9, was obtained.

Comparative Synthesis Example 10 (Synthesis of Aromatic Compound G10 with Multiple Polyether Side Chains)

To a stainless steel reactor equipped with a thermometer, a stirrer and a feed tube, 120 g of F10 was added. Then 0.22 g of E2 was added to the reactor while stirring at room temperature. After further stirring at room temperature for 30 minutes, the system was evacuated after 3 nitrogen replacements and the temperature was raised to 120° C., under which 836 g of ethylene oxide (EO) was fed to the system at a pressure during feeding not higher than 0.4 Mpa. After cooling to room temperature, a pale yellow solid, i.e., the compound G10, was obtained.

As compared to the Synthesis Example 27, the Comparative Synthesis Example 10 utilized the polyhydroxy aromatic intermediate F10 comprising a larger number of hydroxyl groups as a starting agent, and produced the Compound G10 comprising 8 side chains on the same aromatic structural unit.

Comparative Synthesis Example 11 (Synthesis of Aromatic Compound G11 with Single Polyether Side Chain)

To a stainless steel reactor equipped with a thermometer, a stirrer and a feed tube, 120 g of A1 was added. Then 1.04 g of E2 was added to the reactor while stirring at room temperature. After further stirring at room temperature for 30 minutes, the system was evacuated after 3 nitrogen replacements and the temperature was raised to 120° C., under which 497 g of ethylene oxide (EO) was fed to the system at a pressure during feeding not higher than 0.4 Mpa. After cooling to room temperature, a pale yellow solid, i.e., the compound G11, was obtained.

As compared to the Synthesis Example 27, the Comparative Synthesis Example 11 utilized the A1 comprising only 1 hydroxyl group as a starting agent, and produced the Compound G11 comprising only 1 side chain on the same aryl structural unit.

Comparative Synthesis Example 12 (Synthesis of Aromatic Compound G12 with Multiple Polyether Side Chains)

To a stainless steel reactor equipped with a thermometer, a stirrer and a feed tube, 120 g of F9 was added. Then 0.50 g of E2 was added to the reactor while stirring at room temperature. After further stirring at room temperature for 30 minutes, the system was evacuated after 3 nitrogen replacements and the temperature was raised to 120° C., under which 277 g of ethylene oxide (EO) was fed to the system at a pressure during feeding not higher than 0.4 Mpa. After cooling to room temperature, a pale yellow solid, i.e., the compound G12, was obtained.

The Comparative Synthesis Example 12 and the Synthesis Example 27 both produced a compound comprising 3 side chains on the same aryl structural unit, but in the Comparative Synthesis Example 12, due to a lower EO feed, the length of the side chain was shorter.

Comparative Synthesis Example 13 (Synthesis of Aromatic Compound G13 with Multiple Polyether Side Chains)

To a stainless steel reactor equipped with a thermometer, a stirrer and a feed tube, 120 g of F9 was added. Then 0.50 g of E2 was added to the reactor while stirring at room temperature. After further stirring at room temperature for 30 minutes, the system was evacuated after 3 nitrogen replacements and the temperature was raised to 120° C., under which 3043 g of ethylene oxide (EO) was fed to the system at a pressure during feeding not higher than 0.4 Mpa. After cooling to room temperature, a pale yellow solid, i.e., the compound G13, was obtained.

The Comparative Synthesis Example 13 and the Synthesis Example 27 both produced a compound comprising 3 side chains on the same aryl structural unit, but in the Comparative Synthesis Example 12, due to a higher EO feed, the length of the side chain was longer.

The codes of raw materials or intermediates used in the examples and comparative examples are shown in Table 2:

TABLE 2

The codes of raw materials or intermediates in the examples and comparative examples

| Codes | Monomer name | Source |
|---|---|---|
| C1 | Phosphonate monoester monomer (II), wherein R3 is H, X is O, and c = 1 | Self-synthesized |
| C2 | Phosphonate monoester monomer (II), wherein R3 is 3-methyl, X is O, and c = 1 | Self-synthesized |
| C3 | Phosphonate monoester monomer (II), wherein R3 is 3-ethyl, X is O, and c = 1 | Self-synthesized |
| C4 | Phosphonate monoester monomer (II), wherein R3 is 4-methyl, X is O, and c = 1 | Self-synthesized |
| C5 | Phosphonate monoester monomer (II), wherein R3 is 3-methoxy, X is O, and c = 1 | Self-synthesized |
| C6 | Phosphonate monoester monomer (II), wherein R3 is 3-ethoxy, X is O, and c = 1 | Self-synthesized |

TABLE 2-continued

The codes of raw materials or intermediates in the examples and comparative examples

| Codes | Monomer name | Source |
|---|---|---|
| C7 | Phosphonate monoester monomer (II), wherein R3 is 4-methoxy, X is O, and c = 1 | Self-synthesized |
| C8 | Phosphonate monoester monomer (II), wherein R3 is H, X is N, and c = 2 | Self-synthesized |
| C9 | Phosphonate monoester monomer (II), wherein R3 is H, X is O, and c = 1 | Self-synthesized |
| G1 | Aromatic monomer (Ia) with multiple side chains, wherein R1 is H, m is 21, and a is 2 | Self-synthesized |
| G2 | Aromatic monomer (Ia) with multiple side chains, wherein R1 is 3-methyl, m is 21, and a is 2 | Self-synthesized |
| G3 | Aromatic monomer (Ia) with multiple side chains, wherein R1 is 3-ethyl, m is 15, and a is 3 | Self-synthesized |
| G4 | Aromatic monomer (Ia) with multiple side chains, wherein R1 is 4-methyl, m is 15, and a is 3 | Self-synthesized |
| G5 | Aromatic monomer (Ia) with multiple side chains, wherein R1 is 3-methoxy, m is 16, and a is 4 | Self-synthesized |
| G6 | Aromatic monomer (Ia) with multiple side chains, wherein R1 is 3-ethoxy, m is 10, and a is 5 | Self-synthesized |
| G7 | Aromatic monomer (Ia) with multiple side chains, wherein R1 is 4-methoxy, m is 45, and a is 1 | Self-synthesized |
| G8 | Aromatic monomer (Ib) with multiple side chains, wherein R2 is H, n is 15, and b is 1 | Self-synthesized |
| G9 | Aromatic monomer (Ia) with multiple side chains, wherein R1 is H, m is 13, and a is 2 | Self-synthesized |
| G10 | Aromatic monomer (Ia) with multiple side chains, wherein R1 is H, m is 13, and a is 7 | Self-synthesized |
| G11 | Aromatic monomer (Ia) with single side chain, wherein R1 is H, m is 13, and a is 0 | Self-synthesized |
| G12 | Aromatic monomer (Ia) with multiple side chains, wherein R1 is H, m is 5, and a is 2 | Self-synthesized |
| G13 | Aromatic monomer (Ia) with multiple side chains, wherein R1 is H, m is 55, and a is 2 | Self-synthesized |
| H1 | Formaldehyde | Commercially available |
| H2 | Paraformaldehyde | Commercially available |
| H3 | Glyoxylic acid | Commercially available |
| H4 | Benzaldehyde | Commercially available |
| I1 | Sulfuric acid | Commercially available |
| I2 | Methanesulfonic acid | Commercially available |
| I3 | Ethanesulfonic acid | Commercially available |
| I4 | 2-Hydroxybenzenesulfonic acid | Commercially available |
| I5 | 3-Hydroxybenzenesulfonic acid | Commercially available |
| I6 | 4-Hydroxybenzenesulfonic acid | Commercially available |

Example 1 (Synthesis of Polycondensate Water-Reducer MSSP-1)

To a glass reactor equipped with a thermometer, a stirrer and a reflux condenser, 150 g of C1 was added. Then 1168 g of G1, 91.15 g of H1, and 29.95 g of I1 were added to the reactor while stirring at room temperature. After mixing evenly, the temperature was raised to 110° C., under which the reaction was continued for 4.5 hours. After cooling to room temperature, the product was prepared into an aqueous solution with pH=7 and a solid content of 30% using sodium hydroxide and water, to yield the polycondensate water-reducer MSSP-1 with branched side chains of the present application.

Example 2 (Synthesis of Polycondensate Water-Reducer MSSP-2)

To a glass reactor equipped with a thermometer, a stirrer and a reflux condenser, 150 g of C2 was added. Then 794 g of G2, 29.88 g of H2, and 30.43 g of I2 were added to the reactor while stirring at room temperature. After mixing evenly, the temperature was raised to 115° C., under which the reaction was continued for 3.5 hours. After cooling to room temperature, the product was prepared into an aqueous solution with pH=7 and a solid content of 30% using sodium hydroxide and water, to yield the polycondensate water-reducer MSSP-2 with branched side chains of the present application.

Example 3 (Synthesis of Polycondensate Water-Reducer MSSP-3)

To a glass reactor equipped with a thermometer, a stirrer and a reflux condenser, 150 g of C3 was added. Then 615 g of G3, 91.15 g of H3, and 29.95 g of I3 were added to the reactor while stirring at room temperature. After mixing evenly, the temperature was raised to 120° C., under which the reaction was continued for 3 hours. After cooling to room temperature, the product was prepared into an aqueous solution with pH=7 and a solid content of 30% using sodium hydroxide and water, to yield the polycondensate water-reducer MSSP-3 with branched side chains of the present application.

Example 4 (Synthesis of Polycondensate Water-Reducer MSSP-4)

To a glass reactor equipped with a thermometer, a stirrer and a reflux condenser, 150 g of C4 was added. Then 974 g of G4, 133.70 g of H4, and 42.64 g of I1 were added to the reactor while stirring at room temperature. After mixing evenly, the temperature was raised to 140° C., under which the reaction was continued for 2 hours. After cooling to room temperature, the product was prepared into an aqueous solution with pH=7 and a solid content of 30% using sodium hydroxide and water, to yield the polycondensate water-reducer MSSP-4 with branched side chains of the present application.

Example 5 (Synthesis of Polycondensate Water-Reducer MSSP-5)

To a glass reactor equipped with a thermometer, a stirrer and a reflux condenser, 150 g of C5 was added. Then 301 g of G5, 66.23 g of H1, and 31.37 g of I2 were added to the reactor while stirring at room temperature. After mixing evenly, the temperature was raised to 120° C., under which the reaction was continued for 3 hours. After cooling to room temperature, the product was prepared into an aqueous solution with pH=7 and a solid content of 30% using sodium hydroxide and water, to yield the polycondensate water-reducer MSSP-5 with branched side chains of the present application.

Example 6 (Synthesis of Polycondensate Water-Reducer MSSP-6)

To a glass reactor equipped with a thermometer, a stirrer and a reflux condenser, 150 g of C6 was added. Then 609 g of G6, 25.20 g of H2, and 42.01 g of 13 were added to the reactor while stirring at room temperature. After mixing evenly, the temperature was raised to 115° C., under which the reaction was continued for 5 hours. After cooling to room temperature, the product was prepared into an aqueous solution with pH=7 and a solid content of 30% using sodium hydroxide and water, to yield the polycondensate water-reducer MSSP-6 with branched side chains of the present application.

Example 7 (Synthesis of Polycondensate Water-Reducer MSSP-7)

To a glass reactor equipped with a thermometer, a stirrer and a reflux condenser, 150 g of C7 was added. Then 318 g of G7, 71.75 g of H1, and 27.45 g of 12 were added to the reactor while stirring at room temperature. After mixing evenly, the temperature was raised to 100° C., under which the reaction was continued for 8 hours. After cooling to room temperature, the product was prepared into an aqueous solution with pH=7 and a solid content of 30% using sodium hydroxide and water, to yield the polycondensate water-reducer MSSP-7 with branched side chains of the present application.

Example 8 (Synthesis of Polycondensate Water-Reducer MSSP-8)

To a glass reactor equipped with a thermometer, a stirrer and a reflux condenser, 150 g of C8 was added. Then 369 g of G8, 22.74 g of H2, and 36.38 g of 12 were added to the reactor while stirring at room temperature. After mixing evenly, the temperature was raised to 105° C., under which the reaction was continued for 3 hours. After cooling to room temperature, the product was prepared into an aqueous solution with pH=7 and a solid content of 30% using sodium hydroxide and water, to yield the polycondensate water-reducer MSSP-8 with branched side chains of the present application.

Example 9 (Synthesis of Polycondensate Water-Reducer MSSP-9)

To a glass reactor equipped with a thermometer, a stirrer and a reflux condenser, 150 g of C9 was added. Then 688 g of G9, 108.82 g of H1, and 51.57 g of I1 were added to the reactor while stirring at room temperature. After mixing evenly, the temperature was raised to 105° C., under which the reaction was continued for 5 hours. After cooling to room temperature, the product was prepared into an aqueous solution with pH=7 and a solid content of 30% using sodium hydroxide and water, to yield the polycondensate water-reducer MSSP-9 with branched side chains of the present application.

Example 10 (Synthesis of Polycondensate Water-Reducer MSSP-10)

To a glass reactor equipped with a thermometer, a stirrer and a reflux condenser, 150 g of C9 was added. Then 459 g of G9, 89.29 g of H1, and 76.64 g of 14 were added to the reactor while stirring at room temperature. After mixing evenly, the temperature was raised to 105° C., under which the reaction was continued for 7 hours. After cooling to room temperature, the product was prepared into an aqueous solution with pH=7 and a solid content of 30% using sodium hydroxide and water, to yield the polycondensate water-reducer MSSP-10 with branched side chains of the present application.

Example 11 (Synthesis of Polycondensate Water-Reducer MSSP-11)

To a glass reactor equipped with a thermometer, a stirrer and a reflux condenser, 150 g of C9 was added. Then 918 g of G9, 97.66 g of H1, and 75.84 g of 15 were added to the reactor while stirring at room temperature. After mixing evenly, the temperature was raised to 105° C., under which the reaction was continued for 4 hours. After cooling to room temperature, the product was prepared into an aqueous solution with pH=7 and a solid content of 30% using sodium hydroxide and water, to yield the polycondensate water-reducer MSSP-11 with branched side chains of the present application.

Example 12 (Synthesis of Polycondensate Water-Reducer MSSP-12)

To a glass reactor equipped with a thermometer, a stirrer and a reflux condenser, 150 g of C9 was added. Then 1721 g of G9, 156.95 g of H1, and 99.70 g of 16 were added to the reactor while stirring at room temperature. After mixing evenly, the temperature was raised to 105° C., under which the reaction was continued for 10 hours. After cooling to room temperature, the product was prepared into an aqueous solution with pH=7 and a solid content of 30% using sodium hydroxide and water, to yield the polycondensate water-reducer MSSP-12 with branched side chains of the present application.

Comparative Example 1 (Synthesis of Polycondensate Water-Reducer MSSP-13)

To a glass reactor equipped with a thermometer, a stirrer and a reflux condenser, 150 g of C9 was added. Then 1799 g of G10, 108.82 g of H1, and 51.57 g of I1 were added to the reactor while stirring at room temperature. After mixing evenly, the temperature was raised to 105° C., under which the reaction was continued for 5 hours. After cooling to room temperature, the product was prepared into an aqueous solution with pH=7 and a solid content of 30% using sodium hydroxide and water, to yield the polycondensate water-reducer MSSP-13 with branched side chains of the present application.

The polycondensate water-reducer MSSP-13 synthesized in the Comparative Example 1 comprised 8 side chains on single aryl unit, while the polycondensate water-reducer MSSP-9 synthesized in the Example 9 comprised 3 side chains on single aryl unit.

Comparative Example 2 (Synthesis of Polycondensate Water-Reducer MSSP-14)

To a glass reactor equipped with a thermometer, a stirrer and a reflux condenser, 150 g of C9 was added. Then 244 g of G11, 108.82 g of H1, and 51.57 g of I1 were added to the reactor while stirring at room temperature. After mixing evenly, the temperature was raised to 105° C., under which the reaction was continued for 5 hours. After cooling to room temperature, the product was prepared into an aqueous solution with pH=7 and a solid content of 30% using sodium hydroxide and water, to yield the polycondensate water-reducer MSSP-14 with branched side chains of the present application.

The polycondensate water-reducer MSSP-14 synthesized in the Comparative Example 2 comprised 1 side chain on single aryl unit, while the polycondensate water-reducer MSSP-9 synthesized in the Example 9 comprised 3 side chains on single aryl unit.

Comparative Example 3 (Synthesis of Polycondensate Water-Reducer MSSP-15)

To a glass reactor equipped with a thermometer, a stirrer and a reflux condenser, 150 g of C9 was added. Then 325 g of G12, 108.82 g of H1, and 51.57 g of I1 were added to the reactor while stirring at room temperature. After mixing evenly, the temperature was raised to 105° C., under which the reaction was continued for 5 hours. After cooling to room temperature, the product was prepared into an aqueous solution with pH=7 and a solid content of 30% using sodium hydroxide and water, to yield the polycondensate water-reducer MSSP-15 with branched side chains of the present application.

The polycondensate water-reducer MSSP-15 synthesized in the Comparative Example 3 comprised 5 polyoxyethylene units on side chains and the length of the side chain was relatively short, while the polycondensate water-reducer MSSP-9 synthesized in the Example 9 comprised 13 polyoxyethylene units on side chains.

Comparative Example 4 (Synthesis of Polycondensate Water-Reducer MSSP-16)

To a glass reactor equipped with a thermometer, a stirrer and a reflux condenser, 150 g of C9 was added. Then 2594 g of G13, 108.82 g of H1, and 51.57 g of I1 were added to the reactor while stirring at room temperature. After mixing evenly, the temperature was raised to 105° C., under which the reaction was continued for 5 hours. After cooling to room temperature, the product was prepared into an aqueous solution with pH=7 and a solid content of 30% using sodium hydroxide and water, to yield the polycondensate water-reducer MSSP-16 with branched side chains of the present application.

The polycondensate water-reducer MSSP-16 synthesized in the Comparative Example 4 comprised 55 polyoxyethylene units on side chains and the length of the side chain was relatively long, while the polycondensate water-reducer MSSP-9 synthesized in the Example 9 comprised 13 polyoxyethylene units on side chains.

Comparative Example 5 (Synthesis of Polycondensate Water-Reducer MSSP-17)

To a glass reactor equipped with a thermometer, a stirrer and a reflux condenser, 150 g of C9 was added. Then 5507 g of G9, 362.73 g of H1, and 171.89 g of I1 were added to the reactor while stirring at room temperature. After mixing evenly, the temperature was raised to 105° C., under which the reaction was continued for 5 hours. After cooling to room temperature, the product was prepared into an aqueous solution with pH=7 and a solid content of 30% using sodium hydroxide and water, to yield the polycondensate water-reducer MSSP-17 with branched side chains of the present application.

The polycondensate water-reducer MSSP-17 synthesized in the Comparative Example 5 had a molar ratio of monomer (II) to monomer (I) of 0.25, while the polycondensate water-reducer MSSP-9 synthesized in the Example 9 had a molar ratio of monomer (II) to monomer (I) of 2.00.

Comparative Example 6 (Synthesis of Polycondensate Water-Reducer MSSP-18)

To a glass reactor equipped with a thermometer, a stirrer and a reflux condenser, 150 g of C9 was added. Then 138 g of G9, 79.80 g of H1, and 37.82 g of I1 were added to the reactor while stirring at room temperature. After mixing evenly, the temperature was raised to 105° C., under which the reaction was continued for 5 hours. After cooling to room temperature, the product was prepared into an aqueous solution with pH=7 and a solid content of 30% using sodium hydroxide and water, to yield the polycondensate water-reducer MSSP-18 with branched side chains of the present application.

The polycondensate water-reducer MSSP-18 synthesized in the Comparative Example 6 had a molar ratio of monomer (II) to monomer (I) of 10.00, while the polycondensate water-reducer MSSP-9 synthesized in the Example 9 had a molar ratio of monomer (II) to monomer (I) of 2.00.

Comparative Example 7 (Synthesis of Polycondensate Water-Reducer MSSP-19)

To a glass reactor equipped with a thermometer, a stirrer and a reflux condenser, 150 g of C9 was added. Then 688 g of G9, 75.54 g of H1, and 51.57 g of I1 were added to the reactor while stirring at room temperature. After mixing evenly, the temperature was raised to 105° C., under which the reaction was continued for 5 hours. After cooling to room temperature, the product was prepared into an aqueous solution with pH=7 and a solid content of 30% using sodium hydroxide and water, to yield the polycondensate water-reducer MSSP-19 with branched side chains of the present application.

The polycondensate water-reducer MSSP-19 synthesized in the Comparative Example 7 had a molar ratio of monomer H to the sum of monomer (II) plus monomer (I) of 0.90, while the polycondensate water-reducer MSSP-9 synthesized in the Example 9 had a molar ratio of monomer H to the sum of monomer (II) plus monomer (I) of 1.30.

Comparative Example 8 (Synthesis of Polycondensate Water-Reducer MSSP-20)

To a glass reactor equipped with a thermometer, a stirrer and a reflux condenser, 150 g of C9 was added. Then 688 g of G9, 133.93 g of H1, and 51.57 g of I1 were added to the reactor while stirring at room temperature. After mixing evenly, the temperature was raised to 105° C., under which the reaction was continued for 5 hours. After cooling to room temperature, the product was prepared into an aqueous solution with pH=7 and a solid content of 30% using sodium hydroxide and water, to yield the polycondensate water-reducer MSSP-20 with branched side chains of the present application.

The polycondensate water-reducer MSSP-20 synthesized in the Comparative Example 8 had a molar ratio of monomer H to the sum of monomer (II) plus monomer (I) of 1.60, while the polycondensate water-reducer MSSP-9 synthesized in the Example 9 had a molar ratio of monomer H to the sum of monomer (II) plus monomer (I) of 1.30.

Comparative Example 9 (Synthesis of Polycondensate Water-Reducer MSSP-21)

To a glass reactor equipped with a thermometer, a stirrer and a reflux condenser, 150 g of C9 was added. Then 688 g of G9, 108.82 g of H1, and 15.47 g of I1 were added to the reactor while stirring at room temperature. After mixing evenly, the temperature was raised to 105° C., under which the reaction was continued for 5 hours. After cooling to room temperature, the product was prepared into an aqueous solution with pH=7 and a solid content of 30% using sodium hydroxide and water, to yield the polycondensate water-reducer MSSP-21 with branched side chains of the present application.

The polycondensate water-reducer MSSP-21 synthesized in the Comparative Example 9 had a molar ratio of catalyst acid I to the sum of monomer (II) plus monomer (I) of 0.15, while the polycondensate water-reducer MSSP-9 synthesized in the Example 9 had a molar ratio of catalyst acid I to the sum of monomer (II) plus monomer (I) of 0.50.

Comparative Example 10 (Synthesis of Polycondensate Water-Reducer MSSP-22)

To a glass reactor equipped with a thermometer, a stirrer and a reflux condenser, 150 g of C9 was added. Then 688 g of G9, 108.82 g of H1, and 77.35 g of I1 were added to the reactor while stirring at room temperature. After mixing evenly, the temperature was raised to 105° C., under which the reaction was continued for 5 hours. After cooling to room temperature, the product was prepared into an aqueous solution with pH=7 and a solid content of 30% using sodium hydroxide and water, to yield the polycondensate water-reducer MSSP-22 with branched side chains of the present application.

The polycondensate water-reducer MSSP-22 synthesized in the Comparative Example 9 had a molar ratio of catalyst acid I to the sum of monomer (II) plus monomer (I) of 0.75, while the polycondensate water-reducer MSSP-9 synthesized in the Example 9 had a molar ratio of catalyst acid I to the sum of monomer (II) plus monomer (I) of 0.50.

Application Example

Application Example 1 (Molecular Weight and Conversion)

In the examples of the present application, the molecular weight and conversion rate of all polymers were measured by Agilent GPC1260, and the experimental conditions were as follows:

Gel columns: guard column, TSKguard Column PWXL+TSKgel G3000PWXL+mixed bed column, TSKgel GMPWXL, three chromatographic columns in series Mobile phase: 0.1 M $NaNO_3$ solution Mobile-phase velocity: 1 ml/min Injection: 20 μl of 0.5% aqueous solution Detector: Agilent differential refractive index detector Standard: polyethylene glycol GPC standard (Sigma-Aldrich, molecular weight: 1,010,000, 478,000, 263,000, 118,000, 44,700, 18,600, 6,690, 1,960, 628, 232)

The molecular weight and conversion rate of all examples and comparative examples are as follows in Table 3

TABLE 3

Molecular weight and conversion rate of examples and comparative examples

| Sample No. | Weight-average molecular weight (g/mol) | Number-average molecular weight (g/mol) | PDI | Conversion rate (%) |
|---|---|---|---|---|
| MSSP-1 | 14646 | 1.77 | 8275 | 89.7 |
| MSSP-2 | 31355 | 1.62 | 19355 | 86.3 |
| MSSP-3 | 18762 | 1.42 | 13213 | 91.6 |
| MSSP-4 | 41249 | 1.57 | 26273 | 86.1 |
| MSSP-5 | 75737 | 1.54 | 49180 | 86.6 |
| MSSP-6 | 39445 | 1.59 | 24808 | 90.1 |
| MSSP-7 | 62243 | 1.71 | 36399 | 86.4 |
| MSSP-8 | 28409 | 1.60 | 17756 | 89.4 |
| MSSP-9 | 33485 | 1.47 | 22779 | 91.8 |
| MSSP-10 | 46271 | 1.64 | 28214 | 91.2 |
| MSSP-11 | 48782 | 1.43 | 34113 | 88.4 |
| MSSP-12 | 52282 | 1.53 | 34171 | 87.5 |
| MSSP-13 | 33841 | 1.73 | 19561 | 90.6 |
| MSSP-14 | 32881 | 1.65 | 19928 | 90.9 |
| MSSP-15 | 30040 | 1.69 | 17775 | 87.3 |
| MSSP-16 | 36974 | 1.66 | 22273 | 91.8 |
| MSSP-17 | 33686 | 1.68 | 20051 | 66.5 |
| MSSP-18 | 30329 | 1.68 | 18053 | 75.5 |
| MSSP-19 | 10135 | 1.66 | 6105 | 59.9 |
| MSSP-20 | 143794 | 1.89 | 76081 | 90.3 |
| MSSP-21 | 8807 | 1.42 | 6202 | 55.6 |
| MSSP-22 | 175633 | 1.83 | 95974 | 90.5 |

As can be seen from the above table, the molar ratio of the monomer (II) to the monomer (I) being too low (MSSP-17, Comparative Example 5) or too high (MSSP-18, Comparative Example 6), the molar ratio of the condensation reagent H to the sum of the monomer (II) plus the monomer (I) being too low (MSSP-19, Comparative Example 7), and the molar ratio of the catalyst acid I to the sum of the monomer (II) plus the monomer (I) being too low (MSSP-21, Comparative Example 9), each resulted in reduced polycondensation efficiency and unsatisfactory reaction conversion rate. Moreover, the molar ratio of the catalyst acid I to the sum of the monomer (II) plus the monomer (I) being too low (MSSP-21, Comparative Example 9) resulted in lower molecular weight than expected.

Meanwhile, the molar ratio of the condensation reagent H to the sum of the monomer (II) plus the monomer (I) being too high (MSSP-20, Comparative Example 8) and the molar ratio of the catalyst acid I to the sum of the monomer (II) plus the monomer (I) being too high (MSSP-22, Comparative Example 10), each resulted in a product having significantly higher molecular weight than expected, which not only affects its performance during use, but also tends to cause production accidents.

Application Example 2 (Neat Plaster and Low Water/Cement Ratio Neat Plaster)

In order to compare the dispersion performance and dispersion retention performance of the polycondensate water-reducer prepared by the present application, the fluidity test of cement neat plaster was carried out with reference to the GB/T8077-2012 standard. 87 g of water was added to 300 g of cement. After stirring for 4 minutes, the fluidity of the cement neat plaster was measured on a flat glass, and the fluidity of the neat plaster after different times was tested. The experimental results are shown in Table 4 below. PCE-1 in the table below is a commercially available polycarboxylate water-reducer from Jiangsu Sobute New Materials Co., Ltd.

TABLE 4

Dispersion performance and dispersion retention performance of the cement neat plaster comprising polycondensate water-reducer (a water/cement ratio of 0.29)

| Sample No. | Addition amount (%) | 4 min | 30 min | 60 min | 120 min |
|---|---|---|---|---|---|
| MSSP-1 | 0.19 | 254 | 246 | 221 | 173 |
| MSSP-2 | 0.19 | 266 | 261 | 237 | 195 |
| MSSP-3 | 0.19 | 252 | 245 | 228 | 181 |
| MSSP-4 | 0.19 | 256 | 250 | 234 | 190 |
| MSSP-5 | 0.19 | 255 | 248 | 223 | 175 |
| MSSP-6 | 0.19 | 265 | 260 | 235 | 185 |
| MSSP-7 | 0.19 | 255 | 248 | 223 | 175 |
| MSSP-8 | 0.19 | 262 | 253 | 231 | 184 |
| MSSP-9 | 0.19 | 270 | 262 | 243 | 203 |
| MSSP-10 | 0.19 | 255 | 250 | 226 | 185 |
| MSSP-11 | 0.19 | 251 | 242 | 225 | 180 |
| MSSP-12 | 0.19 | 242 | 237 | 214 | 168 |
| MSSP-13 | 0.19 | 188 | 177 | 162 | 113 |
| MSSP-14 | 0.19 | 223 | 210 | 193 | 151 |
| MSSP-15 | 0.19 | 167 | 138 | / | |
| MSSP-16 | 0.19 | 218 | 129 | / | |
| MSSP-17 | 0.19 | / | | | |
| MSSP-18 | 0.19 | 237 | 122 | / | |
| MSSP-19 | 0.19 | 158 | / | | |
| MSSP-20 | 0.19 | / | | | |
| MSSP-21 | 0.19 | 147 | / | | |
| MSSP-22 | 0.19 | / | | | |
| PCE-1 | 0.15 | 268 | 243 | 202 | 145 |

Note:
/ indicates that the fluidity of the slurry has not been observed from such moment As can be seen from the above table, the polycondensate water-reducer prepared by the present application provides good dispersion performance for cement particles under the conventional water/cement ratio (0.29). Under an addition amount of 0.19%, the initial fluidity of the neat plaster can reach more than 250 mm, and after 120 minutes, the fluidity of the neat plaster can reach more than 170 mm. Too many side chains (MSSP-13, Comparative Example 1) and too few side chains (MSSP-14, Comparative Example 1) will reduce the dispersion performance to some extent.

The molar ratio of the monomer (II) to the monomer (I) being too low (MSSP-17, Comparative Example 5) or too high (MSSP-18, comparative example 6), the molar ratio of the condensation reagent H to the sum of the monomer (II) plus the monomer (I) being too low (MSSP-19, Comparative Example 7) or too high (MSSP-20, Comparative Example 8) and the molar ratio of the catalyst acid I to the sum of the monomer (II) plus the monomer (I) being too low (MSSP-21, Comparative Example 9) or too high (MSSP-22, Comparative Example 10), all resulted in a low conversion rate and a large deviation from the expected molecular weight, which in turn resulted in a very large drop in dispersion performance.

In order to compare the dispersion performance and dispersion retention performance of the polycondensate water-reducer prepared by the present application at a low water/cement ratio, a reduced amount 66 g of water was added to 300 g of cement. After stirring for 4 minutes, the fluidity of the cement neat plaster was measured on a flat glass, and the fluidity of the neat plaster after different times was tested. The experimental results are shown in Table 5 below. PCE-1 in the table below is a commercially available polycarboxylate water-reducer from Jiangsu Sobute New Materials Co., Ltd.

TABLE 5

Dispersion performance and dispersion retention performance of the cement neat plaster comprising polycondensate water-reducer (a water/cement ratio of 0.23)

| Sample No. | Addition amount (%) | 4 min | 30 min | 60 min | 120 min |
|---|---|---|---|---|---|
| MSSP-1 | 0.28 | 250 | 241 | 223 | 179 |
| MSSP-2 | 0.28 | 256 | 246 | 222 | 174 |
| MSSP-3 | 0.28 | 262 | 252 | 233 | 187 |
| MSSP-4 | 0.28 | 257 | 251 | 228 | 178 |
| MSSP-5 | 0.28 | 268 | 261 | 239 | 199 |
| MSSP-6 | 0.28 | 266 | 258 | 234 | 192 |
| MSSP-7 | 0.28 | 257 | 252 | 228 | 186 |
| MSSP-8 | 0.28 | 258 | 253 | 236 | 195 |
| MSSP-9 | 0.28 | 263 | 255 | 238 | 196 |
| MSSP-10 | 0.28 | 270 | 264 | 239 | 190 |
| MSSP-11 | 0.28 | 253 | 248 | 227 | 179 |
| MSSP-12 | 0.28 | 254 | 244 | 228 | 185 |
| PCE-1 | 0.308 | 222 | 203 | 172 | / |

As can be seen from the above table, the polycondensate water-reducer prepared by the present application provides good dispersion performance for cement particles under the very low water/cement ratio (0.23). Under an addition amount of 0.28%, the initial slurry fluidity can reach more than 250 mm, and after 120 minutes, the slurry fluidity can reach more than 180 mm. However, as for the commercially available polycarboxylate water-reducer PCE-1, it has more excellent dispersion performance than the polycondensate water-reducer prepared by the present application under the conventional water/cement ratio (0.29), but under the very low water/cement ratio, even if the addition amount is higher than 10%, its dispersion performance still cannot reach the level of the polycondensate water-reducer prepared by the present application.

As can be seen, the polycondensate water-reducer with branched side chains prepared by the present application has greatly improved water-reducing ability due to the synergistic effect of the branched side chains and the rigid skeleton of the aromatic ring. Especially under a condition of low water/cement ratio, it shows a further improved water-reducing ability.

Application Example 3 (Mortar Viscosity)

Brookfield viscometer was used to test the apparent viscosity of the cement mortar mixed with the polycondensate water-reducer prepared by the present application. The mixing ratio of the mortar was: 650 g of Conch PO42.5 cement, 1350 g of standard sand, and 200 g of water. The results are shown in Table 6 below.

TABLE 6

Apparent viscosity of the cement mortar

| Sample No. | Addition amount (%) | 4 min Fluidity (mm) | 4 min Viscosity (mPa·S) | 30 min Fluidity (mm) | 30 min Viscosity (mPa·S) | 60 min Fluidity (mm) | 60 min Viscosity (mPa·S) |
|---|---|---|---|---|---|---|---|
| MSSP-1 | 0.24 | 295 | 259 | 260 | 1161.8 | 219 | 2793.2 |
| MSSP-2 | 0.24 | 293 | 200.8 | 258 | 1094.8 | 221 | 2007.9 |
| MSSP-3 | 0.24 | 294 | 171.5 | 260 | 1010.8 | 221 | 2057.6 |
| MSSP-4 | 0.24 | 293 | 368.2 | 255 | 952.8 | 215 | 2002.6 |
| MSSP-5 | 0.24 | 284 | 271.5 | 254 | 1014.7 | 217 | 2916.5 |
| MSSP-6 | 0.24 | 293 | 208.8 | 253 | 737.5 | 216 | 2114.9 |
| MSSP-7 | 0.24 | 292 | 272.1 | 265 | 996 | 210 | 2268 |
| MSSP-8 | 0.24 | 287 | 394 | 261 | 996.6 | 225 | 2660.1 |
| MSSP-9 | 0.24 | 282 | 358.4 | 251 | 750.9 | 222 | 2794.5 |
| MSSP-10 | 0.24 | 287 | 399.7 | 262 | 1129.3 | 218 | 2472.7 |
| MSSP-11 | 0.24 | 287 | 365.5 | 262 | 1122.9 | 217 | 2561.6 |
| MSSP-12 | 0.24 | 293 | 196.7 | 251 | 1151.3 | 225 | 2496.9 |
| PCA-I | 0.19 | 289 | 837.2 | 250 | 2150.3 | 214 | 4436.8 |

As can be seen from the above table, the polycondensate water-reducer prepared by the present application provides good dispersion performance and viscosity reduction effect for the cement mortar. Under an addition amount of 0.24%, the mortar fluidity can reach more than 280 mm and the mortar viscosity is only 200-300 mPa S at the beginning, and after 60 minutes, the mortar fluidity can reach more than 200 mm and the mortar viscosity is 2000-3000 mPa S at that time. The commercially available polycarboxylate water-reducer PCE-1 was used for comparison. Under an addition amount of 0.19%, the mortar fluidity can reach more than 280 mm and the mortar viscosity is about 800 mPa S at the beginning, and after 60 minutes, the mortar fluidity is 214 mm and the mortar viscosity is about 4400 mPa S. As can be seen, since the polycondensate water-reducer prepared by the present application comprises the branched polyether side chains that are more conducive to the formation of a thicker water film layer, it has an obvious viscosity reduction effect.

Application Example 4 (Adaptability)

In order to characterize the adaptability of the polycondensate water-reducer prepared by the present application, the water-reducing and slump-retaining properties of MSSP-9 and PCA-I in three different cements were compared and tested, and the results are shown in Table 7 below. (Cements: Onoda cement/Conch cement/Helin cement; sand: river sand with a fineness modulus Mx=2.6; stone: basalt, continuously graded crushed-stone with a particle size of 5-20 mm. Mixing ratio of concrete was as follows: cement: 480 kg/m³, sand: 722.4 kg/m³, stone: 1083.6 kg/m³, and water: 144 kg/m³. the content of MSSP-9 water-reducer was 0.23%, and the content of PCA-I water-reducer was 0.19%)

TABLE 7

Water-reducing and slump-retaining properties of MSSP-9 and PCA-I in three different cements (river sand)

| No. | Air content (%) 2 min | Air content (%) 60 min | Slump/Expansion (cm) 2 min | Slump/Expansion (cm) 60 min |
|---|---|---|---|---|
| MSSP-9 (Onoda cement) | 3.1 | 2.3 | 22.0/(53*54) | 21.5/(55*58) |
| MSSP-9 (Conch cement) | 3.3 | 3.0 | 23.0/(56*58) | 22.0/(54*56) |
| MSSP-9 (Helin cement) | 4.5 | 2.7 | 23.5/(55*57) | 21.0/(48*50) |

TABLE 7-continued

Water-reducing and slump-retaining properties of MSSP-9 and PCA-I in three different cements (river sand)

| No. | Air content (%) 2 min | Air content (%) 60 min | Slump/Expansion (cm) 2 min | Slump/Expansion (cm) 60 min |
|---|---|---|---|---|
| PCA-I (Onoda cement) | 2.8 | 1.9 | 20.0/(44*45) | 21.5/(53*55) |
| PCA-I (Conch cement) | 3.5 | 3.1 | 22.0/(53*54) | 21.0/(51*52) |
| PCA-I (Helin cement) | 4.3 | 2.5 | 22.5/(61*62) | 18.5/(40*41) |

It can be seen from the above table that there is little difference in initial and late slump/fluidity in the three different concretes formulated with MSSP-9, indicating that MSSP-9 has similar water-reducing and slump-retaining properties in the three different cements, and has good adaptability to raw materials; however as for PCA-I, in Onoda cement, its initial dispersing ability is obviously insufficient, and its dispersing ability is released only after 1 hour, while in Helin cement, its initial dispersing ability is too strong and the later dispersing is insufficient, which indicates that the water-reducing and slump-retaining properties of PCA-I in three different cements are quite different, and the adaptability to raw materials is poor.

When replacing river sand with machine-made sand, the water-reducing and slump-retaining properties of MSSP-9 and PCA-I in three different cements were compared and tested, and the results are shown in Table 8 below.

TABLE 8

Water-reducing and slump-retaining properties of MSSP-9 and PCA-I in three different cements (machine-made sand)

| No. | Air content (%) 2 min | Air content (%) 60 min | Slump/Expansion (cm) 2 min | Slump/Expansion (cm) 60 min |
|---|---|---|---|---|
| MSSP-9 (Onoda cement) | 3.5 | 3.3 | 22.0/(52*55) | 21.0/(53*55) |
| MSSP-9 (Conch cement) | 3.9 | 3.5 | 22.5/(54*55) | 22.0/(52*53) |
| MSSP-9 (Helin cement) | 4.4 | 3.7 | 23.0/(56*57) | 21.0/(50*51) |
| PCA-I (Onoda cement) | 3.3 | 2.9 | 19.0/(37*41) | 17.0/(33*35) |
| PCA-I (Conch cement) | 3.9 | 3.3 | 22.0/(54*54) | 21.0/(45*47) |
| PCA-I (Helin cement) | 4.5 | 3.5 | 22.0/(52*55) | 17.5/(35*37) |

As can be seen from the above table, when replacing river sand with machine-made sand, there is little difference in initial and late slump/fluidity for the concrete formulated with MSSP-9, indicating that the machine-made sand has little effect on its water-reducing and slump-reducing performance, and it has good adaptability; as for PCA-I, when replacing river sand with machine-made sand, its water-reducing and slump-retaining performance decreases to varying degrees, indicating that the water-reducing and slump-retaining performance of PCA-I is greatly affected by the machine-made sand, and its adaptability is poor.

What is claimed is:

1. A polycondensate water-reducer with branched side chains, wherein the molecular structure thereof comprises three structural units, aromatic structural unit I with multiple polyether side chains, phosphate-based aromatic structural unit II, and methylene structural unit III;

the aromatic structural unit I with multiple polyether side chains is an aromatic moiety with 2-4 polyether side chains; the aromatic moiety includes phenyl, methylphenyl or methoxyphenyl;

the phosphate-based aromatic structural unit II is an aromatic moiety with 1-2 phosphonate monoester groups; the aromatic moiety includes phenyl, methylphenyl or methoxyphenyl, and the rest are side chains;

the methylene structural unit III connects the aromatic structural unit with multiple polyether side chains and the phosphate-based aromatic structural unit, the connected structural units are each independently the same or different, and the methylene structural unit connects any two of the structures of the aromatic structural unit I with multiple polyether side chains and the phosphate-based aromatic structural unit II;

the aromatic structural unit I with multiple polyether side chains is obtained from an addition reaction of the polyhydroxy aromatic intermediate F and ethylene oxide, the aromatic structural unit I with multiple polyether side chains is any one of general formula (Ia) or (Ib);

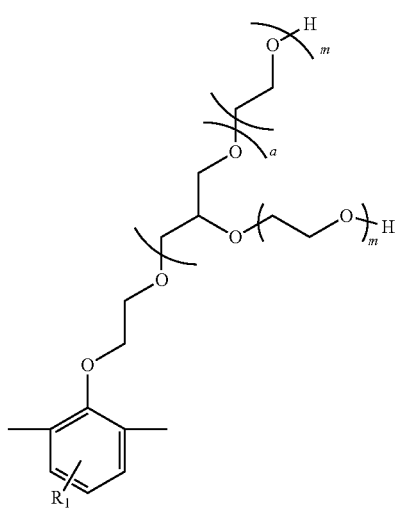

(Ia)

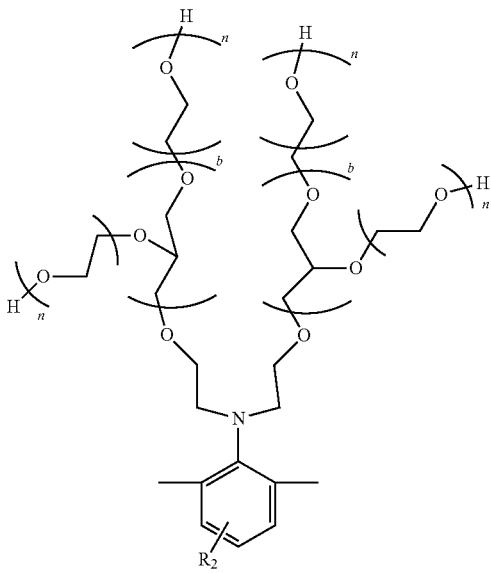

(Ib)

wherein $R_1$ and $R_2$ are each independently the same or different H, $C_1$-$C_4$ alkyl, or $C_1$-$C_4$ alkoxy;

wherein a represents an integer from 1-5, and m represents an integer from 10-50;

wherein b represents an integer from 0-2, and n represents an integer from 10-50;

the phosphate-based aromatic structural unit II conforms to a general formula (II):

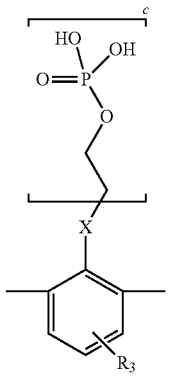

(II)

wherein $R_3$ is H, $C_1$-$C_4$ alkyl, or $C_1$-$C_4$ alkoxy;

wherein X represents O or N, and when X represents O, c=1; and when X represents N, c=2;

the methylene structural unit III connects two aromatic structural units, the two aromatic structural units being independently the same or different; and the molar ratio of structural unit (Ia), structural unit (Ib), and structural unit (II) should satisfy (II)/(Ia)=0.5–8, and (II)/(Ib)=0.5–8.

2. The polycondensate water-reducer with branched side chains of claim 1, which has a weight-average molecular weight of 10,000 to 80,000.

3. A method for preparing the polycondensate water-reducer with branched side chains of claim 1, wherein the water-reducer is prepared by a polycondensation reaction of an aromatic monomer with multiple polyether side chains, a phosphate-based aromatic monomer, and a condensation reagent H under acid catalysis;

the aromatic monomer with multiple polyether side chains is a source monomer of the aromatic structural unit (Ia) or (Ib) with multiple polyether side chains, and is obtained from an addition reaction of a polyhydroxy aromatic intermediate and ethylene oxide;

the phosphate-based aromatic monomer is a source monomer of the phosphate-based aromatic structural unit II, and is an aromatic ring which comprises a phosphonate monoester adsorption group and is unsubstituted or substituted by methyl or methoxy;

the condensation reagent H includes formaldehyde, paraformaldehyde, glyoxylic acid and benzaldehyde, and the molar ratio of the condensation reagent to the total amount of the phosphate-based aromatic monomer plus the aromatic monomer with multiple polyether side chains should satisfy 1.0-1.5; and the acid for catalysis in the polycondensation reaction includes inorganic acid or organic acid, including sulfuric acid, methanesulfonic acid, ethanesulfonic acid, 2-hydroxybenzenesulfonic acid, 3-hydroxybenzenesulfonic acid, and 4-hydroxybenzenesulfonic acid; and the molar ratio of the acid to the total amount of the phosphate-based aromatic monomer plus the aromatic monomer with multiple polyether side chains should satisfy 0.25-0.65.

4. The method of claim 3, wherein the aromatic monomer with multiple polyether side chains is obtained by reacting the polyhydroxy aromatic intermediate F and ethylene oxide in the presence of a catalyst E;

the catalyst E is a substance that is capable of abstracting active hydrogens, and is selected from sodium metal, sodium hydride, and sodium methoxide;

the amount of the catalyst E satisfies that the molar ratio of E/F is 0.02-0.1; and the amount of ethylene oxide (EO) should satisfy the following conditions: when Y is O, EO/F molar ratio is $10(a+1)-50(a+1)$, and when Y is N, EO/F molar ratio is $10(2b+2)-50(2+2)$.

5. The method of claim 4, wherein the method for preparing the aromatic monomer with multiple polyether side chains comprises the following specific steps:

slowly adding the catalyst E to the polyhydroxy aromatic intermediate F with stirring at room temperature, continuing stirring for 10-60 min at room temperature, then raising the temperature to 100-150° C., and slowly feeding EO into a system for reaction, to yield the aromatic monomer with multiple polyether side chains.

6. The method of claim 3, wherein the phosphate-based aromatic monomer conforms to a general formula (III):

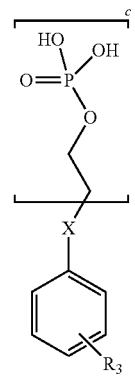

(III)

wherein $R_3$ is H, $C_1$-$C_4$ alkyl, or $C_1$-$C_4$ alkoxy; and
wherein X represents O or N, and when X represents O, c=1; and when X represents N, c=2.

7. The method of claim 6, wherein the phosphate-based aromatic monomer is obtained by an esterification reaction of a monomer J with a phosphonating reagent B;

the general formula of the monomer J is shown in (IV), the monomer J and the aforementioned monomer A conform to the same general formula, and the monomer J is the same as or different from the monomer A;

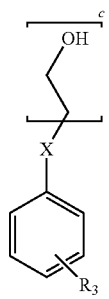

(IV)

wherein $R_3$ is $C_1$-$C_4$ alkyl, or $C_1$-$C_4$ alkoxy;
wherein X represents O or N, and when X represents O, c=1; and when X represents N, c=2; and
the phosphonating reagent B is selected from orthophosphoric acid, phosphorus pentoxide or polyphosphoric acid.

8. The method of claim 7, wherein the esterification reaction of the monomer J with the phosphonating reagent B is carried out as follows:

slowly adding the phosphonating reagent B to the monomer A with stirring at room temperature, continuing stirring for 10-60 minutes at room temperature, then raising the temperature to 80-120° C., and after reaching a predetermined temperature, maintaining the temperature for reaction for 2-10 h and finally cooling to room temperature, to yield the phosphate-based aromatic monomer.

9. The method of claim 3, wherein the method for preparing the polycondensate water-reducer with branched side chains comprises the following specific steps:

mixing the phosphate-based aromatic monomer, the aromatic monomer with multiple polyether side chains, the condensation reagent H and a catalytic acid I and stirring them evenly, raising the temperature to 100-

150° C., maintaining the temperature for reaction for 2-10 h and finally cooling to room temperature, and preparing the product into an aqueous solution with pH=7 and a solid content of 30% using sodium hydroxide and water, to yield the polycondensate water-reducer with branched side chains.

* * * * *